Patented Nov. 3, 1925.

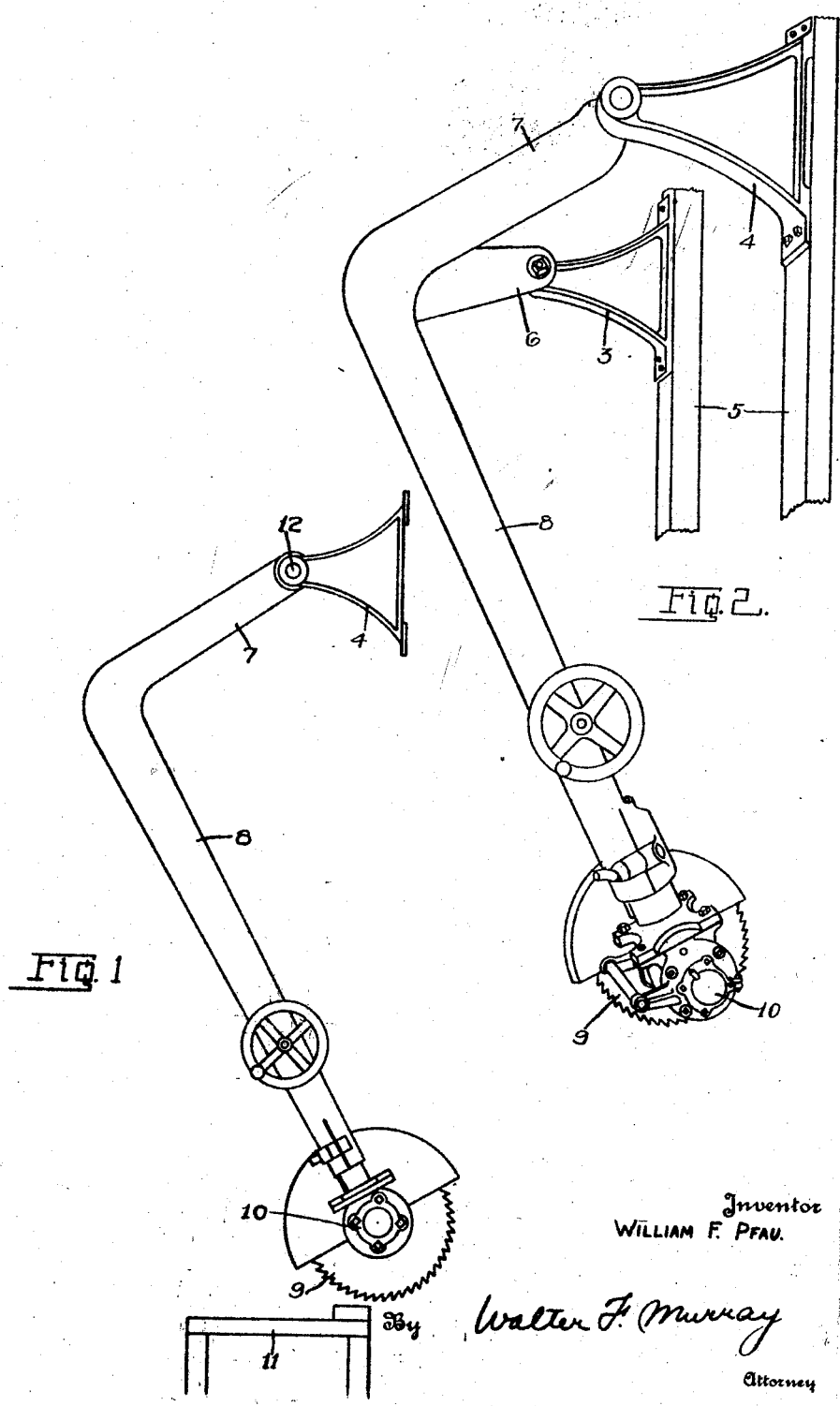

1,560,189

UNITED STATES PATENT OFFICE.

WILLIAM F. PFAU, OF CINCINNATI, OHIO, ASSIGNOR TO ELIZABETH TOWSLEY, OF CINCINNATI, OHIO.

SWING-SAW MOUNTING.

Application filed September 27, 1923. Serial No. 665,084.

*To all whom it may concern:*

Be it known that I, WILLIAM F. PFAU, a citizen of the United States of America, and a resident of Cincinnati, in the county of Hamilton and State of Ohio, have invented a new and useful Improvement in a Swing-Saw Mounting, of which the following is a specification.

An object of my invention is to provide a simple swing saw mounting wherein the use of counterweights can be eliminated.

Another object of my invention is to simplify the mounting of swing saws and the like.

These and other objects are attained by the means described herein and disclosed in the accompanying drawing in which:

Fig. 1 is a side elevation of a swing saw and mounting therefor, embodying my invention.

Fig. 2 is a perspective view of the device shown in Fig. 1.

The device of my invention comprises a pair of brackets 3 and 4 that may be mounted on suitable uprights or standards 5. The brackets 3 and 4 pivotally support branches 6 and 7 formed at the upper end of the depending arm 8. The arm 8 carries at its lower end a saw 9 together with suitable mechanism 10 for actuating the saw. The branches 6 and 7 extend from the arm 8 at substantially right angles and diverge as they recede from the arm 8.

The arrangement of the parts is such that the weight of the arm, together with the parts carried thereby, will cause the saw to be moved, under the influence of gravity, to a position to the rear of the cutting table 11; in other words, the center of mass is so located intermediate the ends of the arm that the lower end of the arm extends to the rear of the axis of the pivotal mounting 12 of the arm on the brackets. The shape of the arm, when viewed from the side is substantially of an elbow or L form.

In the operation of my device the saw is actuated in the same manner as is the common practice, namely, the operator pulls same forwardly over the table 11 and after the cut has been made he releases the saw, whereupon same is returned to the position shown in Fig. 1.

What I claim is:

In a swing saw, the combination with a swing arm, means for supporting same at its upper end, a rotating cutting element mounted in the lower end, said arm having one bend only therein, said bend disposed near the upper end and projecting away from the vertical plane of the support to throw the lower end carrying the saw away from the operator, said cutting element having its center of rotation aligned with the arm portion extending below said bend.

In testimony whereof, I have hereunto subscribed my name this 13th day of September, 1923.

WILLIAM F. PFAU.